Sept. 6, 1966  C. V. FOGELBERG ETAL  3,271,489
METHOD AND APPARATUS FOR FORMING HOLLOW PLASTIC ARTICLES
Filed March 25, 1963  2 Sheets-Sheet 1
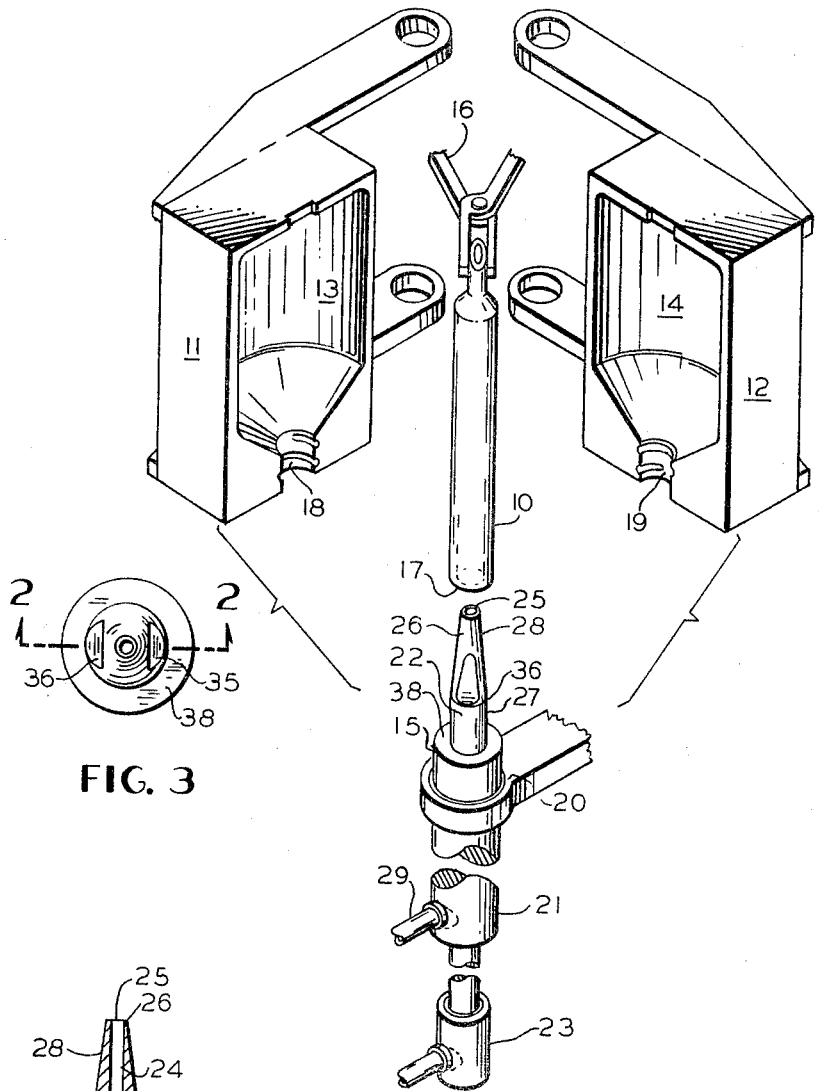
FIG. 3
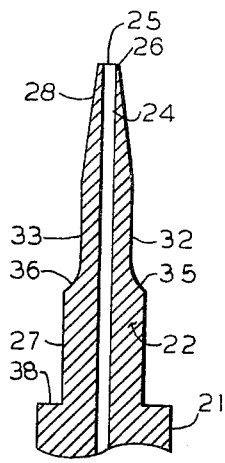
FIG. 2
FIG. 1
INVENTORS.
CLEMENT V. FOGELBERG
PETER W. DART
BY
ATTORNEY

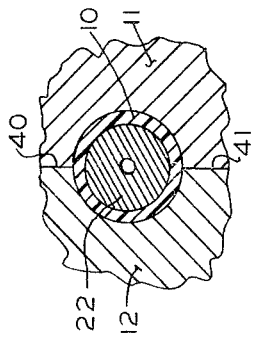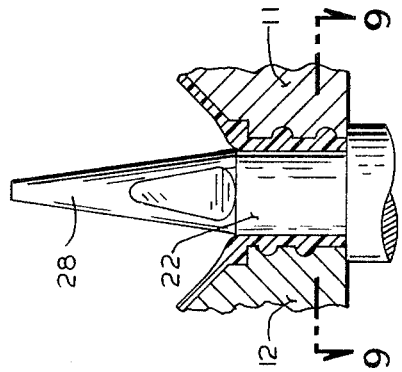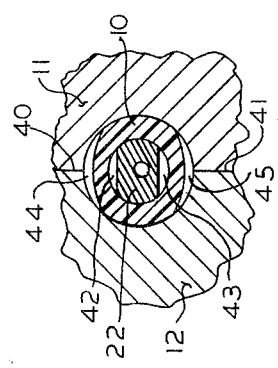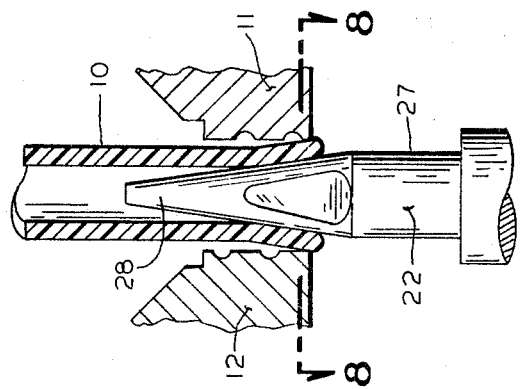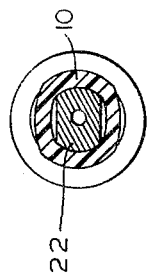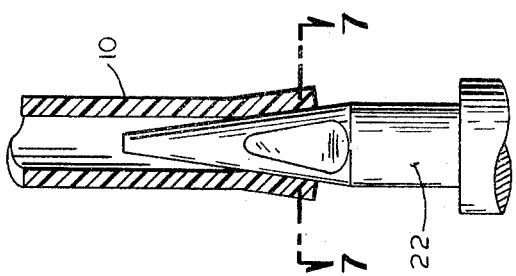

United States Patent Office 3,271,489
Patented Sept. 6, 1966

3,271,489
METHOD AND APPARATUS FOR FORMING
HOLLOW PLASTIC ARTICLES
Clement V. Fogelberg and Peter W. Dart, Boulder, Colo.,
assignors, by mesne assignments, to Ball Brothers Company, Muncie, Ind., a corporation of Indiana
Filed Mar. 25, 1963, Ser. No. 268,516
9 Claims. (Cl. 264—94)

This invention relates to a new and improved method and apparatus for forming hollow plastic articles and more particularly to a new and improved method and apparatus for forming hollow plastic articles, such as containers or bottles, having neck-finish portions.

Heretofore, manufacturers of plastic containers or bottles with neck finishes have experienced several problems, one of which is the inability to produce plastic articles without also forming flash about the outside surface of the neck-finish portion of the article. This problem is especially significant when a partible mold is employed with a parison or length of tubing which must fit into the neck-finish portion of the closed mold within very close tolerance limits. If any excess material is present, it will be pressed into the seam areas of the mold upon closing thereof, leading to the formation of flash. Also, if the parison is not properly centered within the neck-finish portion of the mold, flash may be formed. Often the material formed into flash may be needed in the final article, and, because of the loss of this material from the formed article, defective articles may be produced with defects such as holes or weak spots in the walls or imperfectly formed cap sealing portion.

Even if defective articles do not result from the formation of flash, other problem are encountered. For example, the extra operation of trimming the flash from the bottle is required. This is a difficult and time-consuming operation especially for flash near the neck-finish portion and when threads have been molded thereon. It can readily be seen that it is an intricate operation to interleave a flash-removing tool between the threads on a neck-finish so as to remove the excess material directly adjacent to the body of the bottle without damaging the bottle itself. If the flash is not completely trimmed, problems may result in the use of the bottle such as improper fit or sealing of the closure on the bottle and difficulties in removal of the closure from the bottle. Equipment which has been proposed to remove flash from the neck-finish portion of a bottle has only complicated the problem since it requires very close alignment and requires that each bottle be individually gripped and trimmed.

In view of the difficulties and shortcomings of the methods and apparatus employed heretofore, it was completely unexpected and surprising to discover a method and apparatus which greatly minimizes the formation of flash on the neck-finish portions of containers and bottles. A further advantage of the method and apparatus of the present invention is that even flash on articles having intricate threaded-neck portions formed by press molding operations is substantially completely eliminated. The absence of flash on the articles eliminates the difficult operation of removing flash from between the individual threads and results in a betters fit of the closure on the container or bottle with better seating and sealing characteristics, while allowing easy removal. Moreover, the above advantages and benefits of the invention are achieved by a simple and convenient method and with apparatus which is simple in design and of low manufacturing cost.

Other features and advantages of the invention will become apparent from the following description of the drawings, in which:

FIGURE 1 is a perspective view of apparatus embodying the present invention;

FIGURE 2 is an enlarged longitudinal section through a blow stick of the apparatus shown in FIGURE 1;

FIGURE 3 is a plan view of the blow stick;

FIGURES 4, 5, and 6 are enlarged side views partially in section showing the position of parts of apparatus of the invention at different stages of a molding operation;

FIGURE 7 is a sectional view taken along line 7—7 of FIGURE 4;

FIGURE 8 is a sectional view taken along line 8—8 of FIGURE 5; and

FIGURE 9 is a sectional view taken along line 9—9 of FIGURE 6.

As shown in the drawings, a hollow plastic tube segment or parison 10 is suspended between parted halves 11 and 12 of an open multisectioned blow mold having molding surfaces 13 and 14 and neck-finish portions 18 and 19, respectively. The parison 10 is held in position by a suitable support, shown in the drawings as tongs 16. The parison is of a length such that it extends beyond the neck-finish portions 18 and 19 of the mold halves 11 and 12.

Positioned below the parison 10 and in alignment with the longitudinal axis of the parison, is a blow stick 15 comprising a lower body portion 21 and a smaller upper nozzle portion or mandrel 22, arranged for reciprocal movement longitudinaly by an air cylinder 23 within a sleeve bearing 20. The nozzle portion or mandrel 22 is comprised of a lower cylindrical portion 27 and an upper tapered portion 28, the length of the tapered and cylindrical portions each being at least about as long as and preferably longer than the length of the neck-finish portions 18 and 19 of the mold. The mandrel 22 has a fluid passage or duct 24 therein and an orifice 25 preferably terminating at tip 26. The duct 24 and the orifice 25 which deliver fluid under pressure into the parison 10 are connected to a source of fluid pressure via hose 29.

The tapered upper portion 28 of the mandrel 22 has a number of surfaces 32 and 33 substantially parallel to and equidistant from the longitudinal axis of the mandrel. These surfaces are at least about one-third the length of the neck-finish portion of the mold, and preferably of greater length. The surfaces 32 and 33 smoothly meet and join arcuate surfaces 34 and 35, respectively, which surfaces in turn smoothly meet and join cylindrical portion 27 of the mandrel 22 at edge 36. The cylindrical portion 27 extends downwardly to shoulder 38 which meets the larger body portion 21.

In the operation of the apparatus shown in the drawings, a freshly extruded hollow plastic tube segment or parison 10 is suspended between the mold surfaces 13 and 14. The mandrel 22 is rapidly and abruptly moved upward and inserted partially into the lower open end of the parison. The motion of the mandrel 22 has sufficient force to embed or wedge itself into the lower open end of the suspended parison and cause the parison end to be forced over the tapered portion 28 of the mandrel 22. Since the tapered portion 28 has flat surfaces 32 and 33, the lower portion of the parison will be distorted into an oblong or elliptical shape or periphery as shown in FIGURES 4 and 7. The flat surfaces 32 and 33 of the mandrel 22 are oriented with respect to the mold so that when the mold is closed, the major axis of the ellipse formed by the distortion of parison end will cut the mold surfaces at points angularly displaced from the seam areas or joints of the blow mold as shown in FIGURES 5 and 8. That is, portions of the parison 10 upon which pressure is exerted by the mandrel 22 are angularly displaced from mold seams formed between adjoining sections of the blow mold.

The mold halves 11 and 12 are then closed around the suspended parison 10 with the tapered portion 28 of the mandrel 22 embedded therein so that the lower portion of the parison is firmly secured in the lower neck portion of the mold by compression between the tapered surface 28 of the mandrel 22 and the neck-finish portions 18 and 19 of the mold halves. Although the end of the parison is so secured, small gaps or air spaces 42 and 43 remain between the surfaces 32 and 33 of the mandrel and the inside surface of the parison. Also, air spaces 44 and 45 remain between the outside surface of the parison and the seam areas of the mold wall as shown in FIGURE 8.

The portion beyond the mold neck-finish portion of the parison 10 is then partially expanded to a larger circumference than that of the interior of the neck-finish by the application of a large amount of fluid under pressure through duct 24 and orifice 25. Since the lower end of the parison is firmly secured at the neck-finish portion of the mold, withdrawal is prevented of the end of the parison from the neck-finish portion of the mold due to longitudinal tension created in the parison during the initial expansion. Further, since there are air spaces 42 and 43 between the mandrel and the inside surface of the lower portion of the parison, the fluid circulating through the parison may pass out of the air spaces 42 and 43 to cool the interior surface of the partially formed article and thus shorten molding time. Shortening the molding cycle, in turn facilitates a higher rate of production.

Although the parison 10 is firmly secured in the neck-finish portion of the mold, there is no pressure against the parison wall at the points where the mating mold sections of the multisectioned mold come together forming junctions or seams 40 and 41. In this way, the formation of flash due to excess plastic material being squeezed into the seams during closing of the mold is substantially eliminated.

After the mold is firmly closed and the parison is partially expanded by fluid under pressure, the mandrel 22 is forced into the parison 10 a sufficient distance to cause the end of the parison to bear against shoulder 38. This action causes cylindrical portion 27 of the mandrel 22 to move into the opening in the end of the parison to grip substantially the entire circumference of the open end portion of the parison and to press-form the neck-finish portion of the plastic article. Then the pressure of the fluid applied to substantially the entire interior of the parison is maintained or increased so as to expand the article into conformity with the mold.

Advantageously, the length of the parison is such that the lower open end of the parison extends beyond the neck-finish portion of the mold. This additional length assures that there is sufficient material available in the neck-finish portion of the mold to form a complete neck on the final bottle or container even though there may be some strain recovery between the time that the parison is cut and the time that the lower end thereof is secured in the neck-finish portion of the mold.

The above description shows that the method and apparatus of the present invention provide a simple and convenient means for producing hollow plastic articles such as containers or bottles having press-formed, neck-finish portions substantially free from flash. Moreover, the novel method and apparatus of the invention permit the formation of flash-free, neck-finish portions even with intricate thread patterns or other cap sealing designs or configurations molded thereon. Also, since flash is absent in articles produced according to the present invention, the difficult and time-consuming trimming operations are not necessary, and the equipment investment is reduced.

From the above description of the invention, it will be apparent that various modifications in the apparatus and procedure described in detail herein may be made within the scope of the invention. For example, the parison may have a cross-section other than circular before being distorted by the mandrel. Also, the mold may be of a different design. Therefore, the invention is not intended to be limited to the specific details of procedure and apparatus described herein, except as may be required by the following claims.

What we claim is:

1. In a method for forming hollow plastic articles by the blow molding process wherein a portion of each article is press-formed substantially free from flash in a multisectioned mold, the steps of exerting pressure against portions of the inner wall of the open end portion of a parison to distort said open end portion substantially independently of wall thickness variations, said inner wall portions being angularly displaced from abutment points of the mold sections when said mold is closed, partially expanding said parison, gripping substantially the entire circumference of the open end portion of said parison, and further expanding said parison into forming contact with said mold.

2. In a method for expanding a parison having an open end into forming contact with a surrounding multisectioned mold by blow molding and press-forming, the steps of distorting the periphery of the open end of the parison into an oblong shape that is substantially independent of wall thickness variations of said parison open end, said oblong shape of said parison open end being oriented in a manner such that the major axis is angularly displaced from abutment points of the mold sections when said mold is closed to form a mold cavity, enclosing said parison within said mold cavity, and applying pressure to the interior of said parison to expand said parison into forming contact with said mold cavity and to pressform a portion of said parison substantially free from flash.

3. In a method for expanding a parison having an open end into forming contact with a surrounding multisectioned mold by blow molding and press-forming, the steps of distorting the periphery of the open end of the parison into an oblong shape that is substantially independent of wall thickness variations of said parison open end, applying pressure to the outside surface of the open end of said parison at points adjacent to the major axis of such oblong shape by enclosing said parison within a mold the abutment points of mating surfaces of which are spaced from said pressure application points when said mold is closed, and applying pressure to substantially the entire interior of said parison to expand and press-form said parison into forming contact with said mold sections.

4. In a method for forming hollow plastic articles in which a parison is expanded into contact with a molding surface formed by a multisectioned mold, the steps of applying pressure to portions of the inner wall of the open end portion of a parison to distort said open end portion into an oblong shape that is substantially independent of wall thickness variations of said parison end portion, said inner wall portions being angularly displaced from abutment points of the mold sections when said mold is closed, pressing a molding surface into contact with the outer wall of said parison at points substantially adjacent to said inner wall portions, and expanding and press-forming said parison into forming contact with said molding surface.

5. In a method for forming hollow plastic articles in which a parison having an open end is expanded into contact with a multisectioned molding surface, the steps of distorting the open end portion of a parison into an oblong shape that is substantially independent of wall thickness variations of said parison open end by applying pressure to the inner surface of said open end portion at angularly displaced points, maintaining said pressure while pressing the multisectioned molding surface into contact with the outer surface of said open end portion at points spaced from abutment points of mating sections of said multisectioned molding surface, and expanding said parison into forming contact with said mold molding surface by blow molding and press-forming.

6. A method of forming a hollow plastic article having a neck portion and larger body portion by blow molding and press-forming wherein a parison having an open end is contained within a multisectioned mold and expanded into conformity with the mold, comprising shaping the periphery of the open end of a parison into an oblong form that is substantially independent of wall thickness variations of said parison open end, pressing the neck-finish portion of a mold against the outside surface of said parison at points substantially aligned with the major axis of said oblong form and angularly displaced from abutment points of mating sections of said multisectioned mold while substantially maintaining said oblong form, expanding a portion of said parison beyond said mold neck-finish portion to a larger circumference than that of the interior of said mold neck-finish by applying fluid pressure to the interior of said parison, pressing the substantially entire periphery of said open end of said parison against said mold neck-finish portion to close the interior of said parison to the atmosphere and to press-form the neck portions of said article, and maintaining fluid pressure to expand said parison into final contact with said mold.

7. A method of forming a hollow plastic article having a neck portion and larger body portion by blow molding and press-forming wherein a parison having an open end is contained within a multisectioned mold and expanded into conformity with the mold, comprising shaping the periphery of the open end of a parison into an oblong form that is substantially independent of the wall thickness of said parison open end by applying pressure to the inner wall of the open end of the parison at peripherally spaced-apart points, pressing the neck-finish portion of a mold into contact with the outer wall of the open end of the parison at similarly peripherally spaced-apart points angularly displaced from abutment points of mating sections of said multisectioned mold while maintaining the interior of said parison open to the atmosphere, expanding a portion of said parison beyond said mold neck-finish portion to a larger circumference than that of the interior of said mold neck finish by applying fluid pressure to the interior of said parison, applying radial pressure to the inner wall of the open end of the parison and pressing the outer wall of the open end of the parison into peripheral contact with said mold neck-finish thus closing said parison end to the atmosphere and press-forming the neck portion of said article, and expanding said parison into final contact with said mold by means of fluid pressure.

8. Apparatus for forming a hollow plastic article such as a container or bottle having a substantially flash-free neck-finish portion comprising a multisectioned mold defining a mold cavity having a neck-finish portion and arranged to close about a parison, a mandrel having a cylindrical portion and a tapered portion and a fluid passage therethrough, said tapered portion having an oblong cross section, means to reciprocate said mandrel within said mold cavity through said neck-finish portion, and fluid pressure applying means connected to the fluid passage of said mandrel.

9. In an apparatus for forming a hollow plastic article of the type which includes a multisectioned mold having a neck-finish portion, the combination with said mold of a mandrel having a cylindrical section, a tapered section with two substantially flat surfaces, and a fluid passage therethrough, said mandrel being receivable in said neck-finish portion of said mold to press-form the neck portion of the article substantially free from flash.

References Cited by the Examiner
UNITED STATES PATENTS

| | | |
|---|---|---|
| 2,819,490 | 1/1958 | Froat. |
| 2,898,633 | 8/1959 | Burch. |
| 2,928,120 | 3/1960 | Leghorn et al. |
| 2,935,764 | 5/1960 | Mason _____ 264—98 |
| 3,080,614 | 3/1963 | Adams. |
| 3,084,395 | 4/1963 | Thielfoldt _____ 264—98 |
| 3,114,932 | 12/1963 | Donnelly _____ 264—98 |
| 3,127,636 | 4/1964 | Heider _____ 264—98 |
| 3,164,646 | 1/1965 | Fischer _____ 264—98 |

ROBERT F. WHITE, *Primary Examiner.*

ALEXANDER H. BRODMERKEL, *Examiner.*

M. H. ROSEN, A. R. NOE, *Assistant Examiners.*